United States Patent
Ikemoto et al.

(10) Patent No.: US 6,593,432 B1
(45) Date of Patent: Jul. 15, 2003

(54) RUBBER COMPOSITIONS AND HOSES

(75) Inventors: Ayumu Ikemoto, Komaki (JP); Eiichi Daikai, Inuyama (JP); Koji Senda, Niwa-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 111 days.

(21) Appl. No.: 09/627,115

(22) Filed: Jul. 27, 2000

(30) Foreign Application Priority Data

Aug. 3, 1999 (JP) .......................................... 11-219585

(51) Int. Cl.$^7$ ................................................. C08F 8/00
(52) U.S. Cl. .................... 525/331.8; 525/347; 525/349; 525/352
(58) Field of Search ...................... 525/331.8

(56) References Cited

U.S. PATENT DOCUMENTS 5,112,660 A 5/1992 Saito et al. ................. 428/36.8
6,127,031 A * 10/2000 Fukumoto ................... 428/323
6,179,008 B1 * 1/2001 Kawazura et al. .......... 138/125

FOREIGN PATENT DOCUMENTS

EP 0 832 926 4/1998
JP 11-035748 2/1999

\* cited by examiner

*Primary Examiner*—Bernard Lipman
(74) *Attorney, Agent, or Firm*—Jacobson Holman PLLC

(57) ABSTRACT

A sulfur vulcanizing system rubber composition comprises EPDM, zinc as a vulcanization accelerator activator, at least one thiazole type vulcanization accelerator serving to control the dissolution of zinc from the composition, and at least one ultra-accelerator of the thiuram or dithiocarbamate type, these accelerators being preferably combined under specified quantitative limitations. The hose using this rubber composition is particularly suitable for use in a cooling system for an automobile engine, since the dissolution of zinc into a coolant is prevented, thereby preventing the formation of any zinc compound causing the blocking of the hose, or the leakage of the coolant through the seal between the hose and any pipe connected therewith.

2 Claims, No Drawings

RUBBER COMPOSITIONS AND HOSES

BACKGROUND OF THE INVENTION

1. Field of the Invention

This invention relates to a rubber composition and a hose. More particularly, it relates to a sulfur vulcanizing system rubber composition whose base material is EPDM, and a hose formed therefrom and used, for example, in a cooling system for an automobile engine.

2. Description of the Related Art

A hose having an inner layer formed from a vulcanized rubber composition containing EPDM as a base material has often been used in a cooling system for an automobile engine, for example, with a radiator, or heater. A sulfur vulcanizing system is often used for vulcanizing such rubber composition because of its low cost and its ease of use, though a peroxide cure system can also be used for that purpose.

A combination of a vulcanization accelerator and zinc oxide as its accelerator activator is usually employed for the sulfur vulcanizing system. A thiuram or dithiocarbamate type vulcanization accelerator having a very high vulcanizing rate (ultra-accelerator) is mainly used as the vulcanization accelerator for the sulfur vulcanization of a rubber composition containing EPDM, since EPDM has a chemical structure having few unsaturated bonds.

After the vulcanization of this rubber composition, zinc oxide remains in rubber as a free zinc salt not incorporated in crosslinks. The zinc salt migrates to the surface of the vulcanized material with the blooming of the residues of the vulcanization reaction (i.e. sulfur, vulcanization accelerator, etc.). It is known that the salt dissolves even in a cold coolant.

The dissolved zinc salt reacts with phosphoric acid in the coolant to form an insoluble compound. The insoluble compound causes various problems. The compound deposited on the inner wall surface of a hose is likely to block it, and if it is deposited on the seal of the hose and a pipe connecting the hose, it is likely to cause the leakage of the coolant therethrough.

Therefore, it is necessary to take an effective measure to prevent the dissolution of any zinc salt in a coolant to avoid any such problem, as long as zinc oxide is used for sulfur vulcanization. The inventors of this invention have experimentally found that the reduction in the amount of zinc oxide to be used brings about merely a corresponding reduction in the amount of the zinc salt to be dissolved. That is not an effective measure, since in order to prevent the dissolution of any zinc salt, it is necessary to reduce the amount of zinc oxide to a level insufficient for the purpose of its addition.

SUMMARY OF THE INVENTION

It is, therefore, an object of this invention to provide a sulfur vulcanizing system rubber composition comprising EPDM as a base material such that the dissolution of zinc salt into a coolant is effectively prevented without reducing the amount of zinc oxide to be used.

It is another object of this invention to provide a hose which can be used in a cooling system for an automobile engine without causing any zinc salt to dissolve in a coolant.

The inventors of this invention have found that the thiuram or dithiocarbamate type vulcanization accelerator which has hitherto been used for the sulfur vulcanization of EPDM does not act against the dissolution of a zinc salt, but even promotes it. The inventors have also found that a thiazole type vulcanization accelerator, which is a rapid-accelerator having a relatively high vulcanizing rate, acts effectively against the dissolution of any zinc salt even if it may be used in a relatively small amount. Thus, the inventors have found that the objects of this invention can be attained by the use of a combination of specific vulcanization accelerators.

According to a first aspect of this invention, therefore, there is provided a sulfur vulcanizing system rubber composition comprising an ethylene-propylene-diene terpolymer (EPDM) as a base material, a vulcanization accelerator and zinc, the composition being such that when a vulcanized sheet thereof is left to stay for 24 hours at a normal ambient temperature in a coolant (i.e. an aqueous solution containing 50% by volume of a long-life coolant) in a volume of 10 times the volume of the vulcanized sheet, the amount of zinc dissolved in the coolant is less than 1 ppm.

Any insoluble compound even if formed due to reaction of dissolved zinc and phosphoric acid in the coolant is substantially harmless if the amount of dissolved zinc is less than 1 ppm. If the vulcanized product of the rubber composition according to this invention forms any part contacting an engine coolant, it is possible to avoid any problem caused by the deposition of such insoluble compound. More specifically, if it forms the inner layer of a hose in an engine cooling system, it is possible to avoid any blocking thereof, or any leakage of the coolant through the seal between the hose and any pipe connected therewith.

A second aspect of this invention is a sulfur vulcanizing system rubber composition comprising EPDM as a base material, a vulcanization accelerator and zinc, the vulcanization accelerator being a combination of (1) at least one vulcanization accelerator A capable of controlling the dissolution of zinc to a level as defined in the first aspect when the accelerator alone is contained in an amount of at least 0.005 mol, and (2) at least one vulcanization accelerator B classified as an ultra-accelerator.

The first accelerator A is effective for controlling the dissolution of zinc. The second accelerator B gives the physical properties required of the vulcanized product of the rubber composition, including its physical property in ordinary state and its compression set. It is generally undesirable for any rubber composition to contain too large an amount of vulcanization accelerators, since the blooming of any excessive accelerators is likely to occur. The composition according to this aspect contains in addition to the first accelerator a sufficiently large amount of second, or ultra-accelerator, since the amount of the first accelerator is relatively small. Thus, the composition gives a vulcanized product having the desired physical properties without allowing any undesirable dissolution of zinc.

A third aspect of this invention is a sulfur vulcanizing system rubber composition comprising EPDM as a base material, a vulcanization accelerator and zinc, the vulcanization accelerator being a combination of at least one thiazole type vulcanization accelerator and at least one thiuram or dithiocarbamate type vulcanization accelerator. In order to control the dissolution of zinc to a level as defined in the first aspect, it is sufficient to add at least 0.005 mol of thiazole type vulcanization accelerator. Thus, the composition does not contain any excess of vulcanization accelerators, but gives a vulcanized product having the desired physical properties, and not allowing any undesirable dissolution of zinc.

A fourth aspect of this invention is a sulfur vulcanizing system rubber composition comprising EPDM, a vulcanization accelerator and zinc, the vulcanization accelerator being a combination of each of the following: a thiazole type vulcanization accelerator, a thiuram type vulcanization accelerator, and a dithiocarbamate type vulcanization accelerator. This is a particularly preferable combination of accelerators for the composition to give a vulcanized product having the desired physical properties, and not allowing any undesirable dissolution of zinc. It appears that the combination gives a greatly accelerated vulcanization reaction and produces only a small amount of reaction residues so that their blooming may not cause any undesirable dissolution of a zinc salt.

According to a fifth aspect of this invention, the rubber composition contains a total of 2.0 to 7.0 parts by weight of vulcanization accelerators per 100 parts by weight of EPDM, including 0.1 to 3.0 parts by weight of the above-mentioned accelerator A or a thiazole type accelerator serving to control the dissolution of zinc as mentioned in the first aspect. These are particularly preferable ranges of the proportions of accelerators to give a vulcanized product having the desired physical properties, and not allowing any undesirable dissolution of zinc, as there is no blooming of any excessive accelerator.

According to a sixth aspect of this invention, there is provided a hose formed from the rubber composition according to any aspect of this invention as described above, and particularly suitable for use in an engine cooling system. The use of a hose of this aspect having physical properties as required effectively prevents blocking of the hose due to deposition of any insoluble compound formed by dissolved zinc, or bleakage of a coolant through the seal between the hose and any pipe connected therewith.

The above and other features and advantages of this invention will become more apparent from the following description.

DETAILED DESCRIPTION OF THE INVENTION

Description will now be made in further detail of this invention and preferred modes of carrying it out.

Rubber Composition:

The rubber composition of this invention uses at least a sulfur vulcanizing system and comprises EPDM as a base material, a vulcanization accelerator and zinc white (oxide) as its accelerator activator. "Comprises EPDM as a base material" means "comprises EPDM or a blend with EPDM as the main ingredient." EPDM may be of any type. The type, combination and proportions of the accelerators are not specifically limited, as long as it is possible to control the dissolution of zinc as stated before, though there are preferred types, combinations and proportions as stated below.

Vulcanization Accelerator:

The vulcanization accelerator which the rubber composition of this invention may contain is a combination of at least one first accelerator serving to control the dissolution of zinc effectively, and at least one second accelerator classified as an ultra-accelerator. A preferred first accelerator is, for example, of the thiazole type, while a preferred ultra-accelerator is, for example, of the thiuram or dithiocarbamate type.

Any commercially available thiazole type vulcanization accelerator can be used. Specific examples are SANCELER M of Sanshin Chemical Ind. Co., Ltd., which is 2-mercaptobenzo-thiazole, SANCELER DM of the same company, Ltd., which is dibenzothiazyldisulfide, and SANCELER MZ of the same company, which is a zinc salt of 2-mercaptobenzothiazole. All of the commercially available products which will hereinafter be shown by tradenames are of Sanshin Chemical.

No desired control of zinc dissolution can be expected from sulfenamide type vulcanization accelerators classified as rapid-accelerators, for example, SANCELER CZ or CM, which is N-cyclohexylbenzothiazyl-2-sulfenamide, or SANCELER MSA, which is N-oxyethylenebenzothiazyl-2-sulfenamide.

No desired control of zinc dissolution can be expected from moderate vulcanization accelerators, for example, of the guanidine or thiourea type. They do not have a satisfactorily high vulcanizing rate, either. They are, therefore, not suitable for use in the rubber composition of this invention. SANCELER D, which is N,N'-diphenylguanidine, is an example of the guanidine type accelerators, and SANCELER 22-C, which is ethylenethiourea, is an example of the thiourea type accelerators.

As regards the thiuram type vulcanization accelerator as well, it is possible to use any of the commercially available products. Specific examples are SANCELER TS, which is tetramethylthiuram monosulfide, SANCELER TT, which is tetramethylthiuram disulfide, SANCELER TET, which is tetraethylthiuram disulfide, and SANCELER TBT, which is tetrabutylthiuram disulfide.

As regards the dithiocarbamate type vulcanization accelerator, too, it is possible to use any of the commercially available products. Specific examples are SANCELER PZ, which is zinc dimethyldithiocarbamate, SANCELER EZ, which is zinc diethyidithiocarbamate, and SANCELER BZ, which is zinc dibutyldithiocarbamate.

The proportions of the vulcanization accelerators in the rubber composition are not specifically limited, so long as they are adequate for the purposes for which they are used. It is, however, preferable for the composition to contain a total of 2.0 to 7.0 parts, and more preferably 2.0 to 5.0 parts, by weight of accelerators per 100 parts by weight of EPDM. It is also preferable that they include 0.1 to 3.0 parts, and more preferably 0.5 to 1.5 parts, by weight of the first, or a thiazole type accelerator. If the proportion of the accelerators is too large, their blooming may occur as mentioned before, and if it is too small, there may be obtained an insufficiently vulcanized product not having the desired physical properties.

Zinc White, etc.:

The proportions of zinc white and sulfur in the rubber composition of this invention may not differ from those in any known sulfur-vulcanizable rubber composition. Thus, it may contain about 3 to 10 parts by weight of zinc white and about 0.5 to 2.0 parts by weight of sulfur per 100 parts by weight of EPDM.

Other Additives:

The rubber composition of this invention may further contain any other additives employed in any known rubber composition, for example, carbon black, a plasticizer, process oil, a processing aid and an antioxidant, if they do not exert any adverse effect thereon.

Hose:

The hose of this invention is formed from a vulcanized product of the rubber composition according to any aspect of this invention as described before, and may be used in a cooling system for an automobile engine, or the like. It is preferably used with an automobile radiator, or heater. The vulcanized rubber composition forms at least the inner layer of the hose. Therefore, the hose may have its whole wall formed solely from the rubber composition according to this invention, or may have only the inner layer of its wall formed from the rubber composition and have an outer wall layer formed from another appropriate material, between which a reinforcing layer may or may not be inserted.

EXAMPLES

The invention will now be described by specific examples embodying it.

Example 1

Various rubber compositions containing different vulcanization accelerators were prepared, and tested for the dissolution of zinc under specific conditions as stated below.
Preparation of Rubber Compositions Each rubber composition was prepared by adding different parts by weight of the different vulcanization accelerators as shown in Table 1 to a basic composition containing 100 parts by weight of EPDM, five parts by weight of zinc oxide (ZnO), one part by weight of stearic acid, 130 parts by weight of carbon black, 80 parts by weight of process oil and one part by weight of sulfur. The proportion of each accelerator was so selected that the composition might contain 0.005 mol thereof. ESPRENE 532 of Sumitomo Chemical Co., Ltd. was employed as EPDM, SEAST SO of Tokai Carbon Co., Ltd. as carbon black, and DIANA PROCESS PW-380 of Idemitsu Kosan Co., Ltd. as process oil. The alphabetical letters used in Table 1 for identifying the vulcanization accelerators are of the tradenames of the products SANCELER of Sanshin Chemical as mentioned before. For example, TT means SANCELER TT and PZ means SANCELER PZ. The word "None" appearing at the right top of Table 1 refers to the composition in which no vulcanization accelerator was employed.

Preparation of Test Specimens

Each rubber composition was vulcanized at 150° C. for 30 minutes to form a vulcanized test specimen having a thickness of 2 mm.
Evaluation as to Zinc Dissolution A solution in distilled water of a long-life coolant made by Japan Chemical Co., Ltd., 50% by volume, was prepared as an engine coolant, and each test specimen was dipped in the engine coolant in a volume of 10 times the volume of the specimen (i.e. one part of the specimen in 10 parts of the coolant), and left to stand at 23° C. for 24 hours. The solution in which each test specimen had been dipped was, then, filtered, and the amount of zinc dissolved in the filtrate was measured by a customary method. The result is shown in ppm at "Zinc dissolved" in Table 1, and by a circle (meaning acceptable) when the amount is less than 1.0 ppm, or by an x (meaning unacceptable) when the amount is 1.0 ppm or more.

Example 2

Various rubber compositions were prepared by adding one or more of the following: thiuram, dithiocarbamate, thiazole and other type vulcanization accelerators as shown in Table 2 to a basic composition as in Example 1 (but the sulfur content was changed to 1.5 parts by weight.) The alphabetical letters used in Table 2 for indicating the accelerators, such as TS or PZ, refer to the products of Sanshin Chemical, such as SANCELER TS or PZ. The letter S appearing after the accelerators stands for sulfur. The numerals appearing in the column to the right of the letter S represent the proportions in parts by weight of the vulcanization accelerator or accelerators and sulfur, respectively, in the order of their appearance in the table, per 100 parts by weight of EPDM.
Physical Properties of Vulcanized Products Each rubber composition was vulcanized by kneading at 150° C. for 30 minutes to form the desired vulcanized rubber sheet. A JIS-5 dumbbell was stamped out from each sheet,

TABLE 1

|  |  | Thiuram type | | | | Dithiocarbamate type | | | Thiazole type | | |
|---|---|---|---|---|---|---|---|---|---|---|---|
| Vulcanizaton accelerator |  | TT | TET | TBT | TS | PZ | EZ | BZ | M | DM | MZ |
| Molecular weight |  | 240 | 295.54 | 409 | 208 | 305.8 | 361 | 474.13 | 167.25 | 332.49 | 397.86 |
| Proportion (part(s) by weight) (5/1000 mol) |  | 1.20 | 1.48 | 2.05 | 1.04 | 1.53 | 1.81 | 2.37 | 0.84 | 1.66 | 1.99 |
| Zinc dissolved (ppm) | In 24 hours | 5.8 | 6.5 | 10.0 | 3.2 | 0.7 | 0.9 | 1.0 | 0.5 | 0.8 | 0.9 |
|  | Evaluation | X | X | X | X | ○ | ○ | X | ○ | ○ | ○ |

|  |  | Sulfenamide type | | Guanidine type | Thiourea type | None |
|---|---|---|---|---|---|---|
| Vulcanizaton accelerator |  | CZ | MSA | D | 22C |  |
| Molecular weight |  | 264.41 | 252.36 | 211.27 | 102.16 |  |
| Proportion (part(s) by weight) (5/1000 mol) |  | 1.32 | 1.26 | 1.06 | 0.51 | — |
| Zinc dissolved (ppm) | In 24 hours | 3.6 | 2.4 | 0.2 | 0.1 | 0.3 |
|  | Evaluation | X | X | ○ | ○ | ○ | and was evaluated for its tensile strength TB (MPa) in accordance with the JIS-K 6251 method. The results are shown in Table 2, with a circle indicating a tensile strength exceeding 10 MPa (excellent), a triangle indicating a tensile strength of 8 to 10 MPa (good) and an x indicating a tensile strength lower than 8 MPa (poor).

Testpieces for use in a test for compression set as specified by JIS-K 6262 were prepared from the above kneaded rubber compositions, too. Their compression set was determined after 22 hours of compression at 120° C. The results are shown in Table 2, with a circle indicating a compression set not exceeding 70% (excellent), a triangle indicating a compression set of 71 to 79% (good) and an x indicating a compression set of 80% or above (poor).

Moreover, test specimens from each rubber composition were prepared as in Example 1 and the dissolution of zinc therefrom was examined. The results are shown as "Zinc extracted" in Table 2. The meanings of the symbols are as explained before in connection with Table 1.

Finally, the vulcanized product of each rubber composition was visually examined for any blooming after it had been left to stand at a temperature of 40° C. for 72 hours. The results are shown in Table 2 by a circle indicating that blooming was recognized, and an x indicating that no blooming was recognized.

The results of total evaluation are shown as "Data" at the left edge of Table 2, with a star indicating a good example, a circle indicating a desirable one and an x indicating an undesirable one. In Table 2, "-" indicates the total evaluation was not effected.

TABLE 2

| Data | Thiuram | Dithio-carbamate | Thiazole | Other type | Sulfur | Content of accelerator & sulfur parts by weight | Physical properties in ordinary state | Compression set | Zinc extracted | Blooming |
|---|---|---|---|---|---|---|---|---|---|---|
| X | TS | | | | S | 2/1.5 | ○ | ○ | X | X |
| X | | PZ | | | S | 2/1.5 | ○ | ○ | ○ | X |
| — | | | M | | S | 2/1.5 | Δ | Δ | ○ | ○ |
| X | | | | CZ | S | 2/1.5 | ○ | ○ | X | ○ |
| X | | | | D | S | 2/1.5 | X | X | ○ | ○ |
| ○ | TS | | M | | S | 1/1/1.5 | ○ | ○ | ○ | ○ |
| ○ | | PZ | M | | S | 1/1/1.5 | Δ | Δ | ○ | ○ |
| X | | | M | CZ | S | 1/1/1.5 | Δ | Δ | X | ○ |
| ☆ | TS | PZ | M | | S | 0.75/0.75/0.5/1.5 | ○ | ○ | ○ | ○ |
| ☆ | TS | BZ | M | | S | 0.75/0.75/0.5/1.5 | ○ | ○ | ○ | ○ |
| ☆ | TT | PZ | M | | S | 0.75/0.75/0.5/1.5 | ○ | ○ | ○ | ○ |

While the invention has been described by way of its preferred embodiments, it is to be understood that variations or modifications may be easily made by those skilled in the art without departing from the scope of this invention which is defined by the appended claims.

What is claimed is:

1. A sulfur vulcanizing system rubber composition suitable for a cooling system hose and comprising an ethylene-propylene-diene terpolymer (EPDM) as a base material, a vulcanizing accelerator and zinc, wherein the vulcanizing accelerator comprises a combination of at least one first accelerator capable of controlling dissolution of zinc when at least 0.005 mol of said accelerator is incorporated in said composition, and at least one second accelerator classified as an ultra-accelerator;

the first accelerator being such that, when at least 0.005 mol thereof is incorporated in the composition and a vulcanized sheet of said composition is left to stay for 24 hours at a normal ambient temperature in an aqueous solution containing 50% by volume of a long-life coolant in a volume of 10 times the volume of the vulcanized sheet, the amount of zinc dissolved in said coolant is less than 1 ppm;

the rubber composition containing a total of from 2.0 to 7.0 parts by weight of said vulcanization accelerator, including from 0.1 to 3.0 parts by weight of the first accelerator, each per 100 parts by weight of EPDM;

the first accelerator comprising a thiazole type accelerator selected from the group consisting of 2-mercaptobenzothiazole, a zinc salt thereof and dibenzothiazyldisulfide, and the second accelerator comprising a thiuram type accelerator selected from the group consisting of tetramethylthiuram monosulfide, tetraethylthiuram disulfide and tetrabutylthiuram disulfide.

2. A sulfur vulcanizing system rubber composition comprising an ethylene-propylene-diene terpolymer (EPDM) as a base material, a vulcanizing accelerator and zinc, wherein the vulcanizing accelerator comprises two components, at least one first accelerator capable of controlling dissolution of zinc and at least one second accelerator classified as an ultra-accelerator;

the first accelerator comprising a thiazole type accelerator selected from the group consisting of 2-mercaptobenzothiazole, a zinc salt thereof and dibenzothiazyldisulfide, and being such that, when at least 0.005 mol thereof is incorporated in the composition and a vulcanized sheet of the composition is left to stay for 24 hours at a normal ambient temperature in an aqueous solution containing 50% by volume of a long-life coolant in a volume of 10 times the volume of the vulcanized sheet, the amount of zinc dissolved in said coolant is less than 1 ppm; and the second accelerator comprising a dithiocarbamate type accelerator selected from the group consisting of zinc dimethyldithiocarbamate, zinc diethyldithiocarbamate and zinc dibutyldithiocarbamate.

* * * * *